Dec. 28, 1943.     O. W. BOUGHTON ET AL     2,337,866

TRIAL FRAME

Filed Nov. 6, 1941

OLIN W. BOUGHTON
HENRY F. KURTZ
INVENTORS

BY
ATTORNEYS

Patented Dec. 28, 1943

2,337,866

UNITED STATES PATENT OFFICE 2,337,866

TRIAL FRAME

Olin W. Boughton, Victor, and Henry F. Kurtz, Rochester, N. Y., assignors to Bausch & Lomb Optical Company, Rochester, N. Y., a corporation of New York Application November 6, 1941, Serial No. 418,022

5 Claims. (Cl. 88—20)

The invention relates to ophthalmic instruments and more particularly refers to a trial frame such as that used for holding test lenses which are employed for determining refractive errors of the eye.

One of the objects of this invention is to provide a trial frame having an improved construction of an extremely strong and rigid nature which readily lends itself to simple design. Another object is to provide features in a trial frame, of the type just noted, which permit quick and convenient adjustment of the instrument to fit the facial characteristic of a wearer. Still another object resides in the use of a support which has a curvilinear cross section of non-circular shape and which extends through the arms of the lens cells of the trial frame whereby to permit each lens cell to be moved lengthwise of the support while a further object is to devise means to allow a collar, which is adapted to carry a nosepiece, to be rotatably mounted midway between the ends of such a support. Yet a further object of the invention is to provide improved means for adjustably securing the temples of a trial frame to the support for the lens cells.

With these and other objects in view which may be incident to these improvements, this invention consists in the parts and combinations to be hereinafter set forth and claimed, with the understanding that the several necessary elements comprising the same may be varied in construction, proportion and arrangement without departing from the spirit of the invention or exceeding the scope of the appended claims.

In order to clearly understand the invention, there is shown in the accompanying drawing means for carrying the same into practical effect without limiting the improvements in their useful applications to the particular constructions which, for the purpose of explanation, have been made the subject of illustration.

Figure 1:
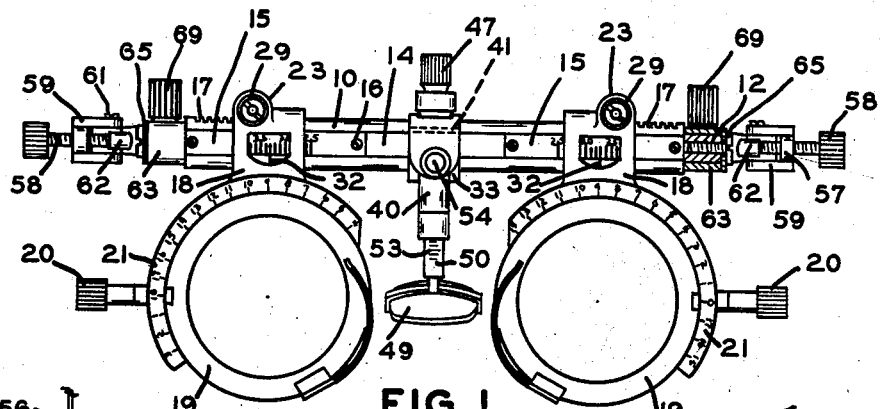
Figure 1 is a front elevation of the trial frame of the invention.

A preferred embodiment of the invention is disclosed in the drawing wherein like reference numerals are employed to designate similar parts throughout the different views. The invention makes use of a support 10 which is adapted to carry the lens cells and the nosepiece of the trial frame and to have the temples connected thereto. Support 10, which is preferably an extruded tubular member, is given a curvilinear cross section of non-circular shape, somewhat elliptical in outline, and is provided with a reduced intermediate or central portion 11 of circular cross section. It is on the central portion 11, best shown in Figure 5, that the nosepiece assembly for the trial frame is supported in a manner to be presently described.

Spindles 12, each adapted to have a temple assembly of the trial frame pivoted thereon, are provided at opposite ends of the support 10 by reducing the cross section of the support and giving it a circular shape, as disclosed at these locations in Figure 1.

Channels 14 and 14' are formed in the surface of support 10 to extend lengthwise thereof on each side of the major transverse axis of the support. A pair of scale plates 15, having scales formed thereon for a purpose to be hereinafter detailed, are seated in channel 14 and held therein by screws 16 which engage the support 10. Friction between support 10 and any members slidable thereon, such as the lens cell arms to be presently described, may be reduced by seating each scale plate 15 so that its outer surface lies within the channel 14. Also, to limit friction between the support and such slidable members, the channel 14' is generally provided in support 10.

Figure 2:
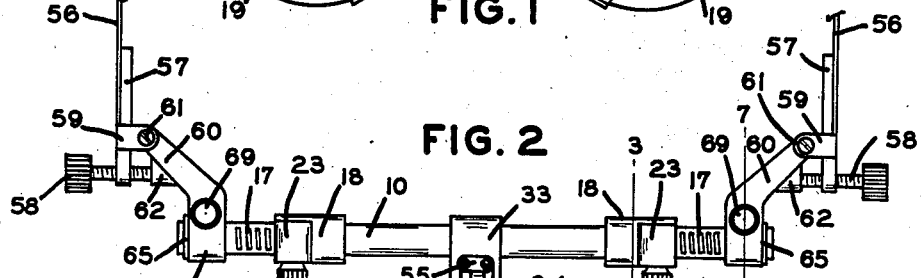
Figure 2 is a plan view of the trial frame of Figure 1.

Details of the support are completed by the rack teeth 17, a set of which is formed on the upper surface of the support 10 adjacent each end of the support as disclosed in Figures 1 and 2. These racks 17 cooperate with pinion means to the end of adjusting the lens cells of the trial frame lengthwise of the support. The particular construction disclosed permits the rack teeth to be formed integrally with the support 10 by merely cutting a series of suitably shaped and positioned slots through the upper surface of the support.

Arms 18 are employed to support the lens cells 19 of the instrument. These lens cells 19 are of convenient design and are each adapted to removably support the test lenses used with the trial frame. Each arm 18 terminates at one end in the usual circular ring portion in which a lens cell 19 is supported, in any well known manner, for rotation about an axis which is normal to the plane of Figure 1. Rotation of each lens cell 19 is effected by conventional gear means, not shown but which are actuated through a finger piece 20 on the end of a drive shaft for such gear means. The front surface of the circular shaped ring portion of each arm 18 is provided with a flange 21 which partially encircles the supported lens cell and which has the usual scale means, employed with devices of this character, formed thereon.

Figures 3, 4, 5:
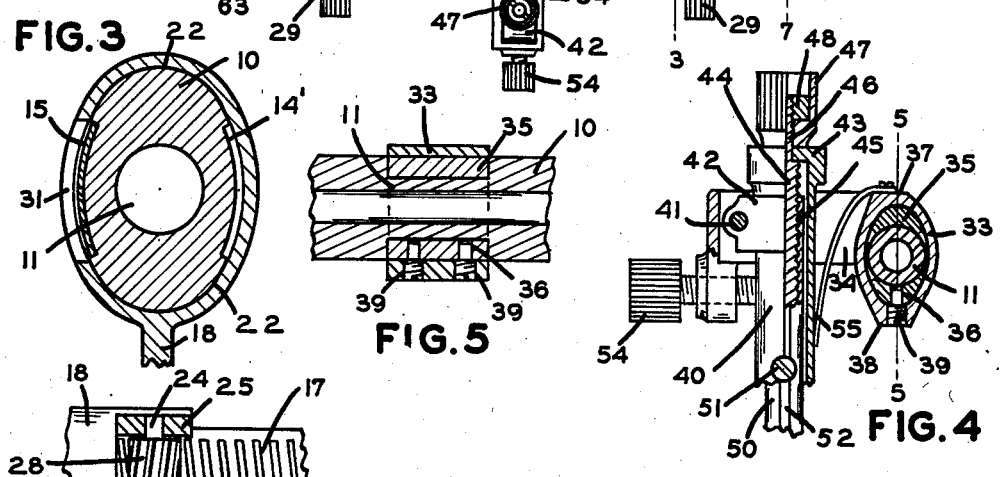
Figure 3 is a sectional elevation on the line 3—3 of Figure 2.
Figure 4 is a detailed elevation, with parts in section and parts broken away, of the nosepiece assembly for the trial frame and shows the connection with the lens cell support.
Figure 5 is a sectional view, with parts broken away, taken longitudinally through the lens cell support of the trial frame to show the central section thereof.

By providing an opening 22 through the end of each arm 18 away from its lens cell 19, the two arms may be mounted on support 10 so that the support extends through the arms and so that the arms are slidable along the support. As best shown in Figure 3, to carry out this construction, the cross section of the opening 22 is given a shape which substantially conforms to that of the non-circular cross section of the support 10. Thus each arm 18 will engage the support 10 in a sliding fit and due to giving the opening 22 a non-circular cross section which is substantially similar in shape and size to the non-circular cross section of the support 10, will be mounted on the support in a manner to prevent its undesirable rocking movement.

To adjust the trial frame for different pupillary distances, it is necessary that the lens cells be moved in a path which is parallel to the support 10. This is readily accomplished by locating the lens cell mounts so that the axis of rotation of each lens cell 19 and the longitudinal axis of each opening 22 will be at right angles to each other and will lie in substantially parallel planes.

A number of advantages are derived by providing the support 10 with a non-circular shape such as that described. For example, such a support will obviously hold the lens cell arms against rocking movement or rotation. This construction avoids the use of a key to hold the lens cell arms against rotation, as where the support has a circular cross section, and also does away with cumbersome and complicated structure which employs a plurality of rods on which the lens cells are slidably mounted. A tubular support with a curvilinear cross section is more easily formed than a similar support having a true rectangular, or square or triangular cross section and at the same time possesses a lighter weight than a support made from bar material. Besides these advantages, it is to be noted that the support 10 and arms 18 provide a strong and rugged structure.

Figures 6, 7:
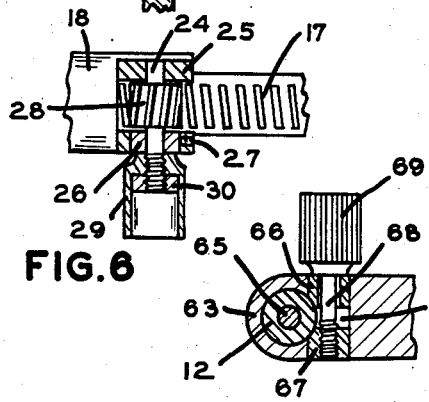
Figure 6 is an enlarged plan view of the mechanism for moving the lens cells along the lens cell support, parts of the mechanism being shown in section.
Figure 7 is a partial sectional elevation on the line 7—7 of Figure 2.

A gear casing 23 is formed on the portion of each arm 18 which lies above the support 10 for the purpose of housing mechanism adapted to move each arm along the support so that the lens cells may be centered before the eyes of a person who is wearing the trial frame. Each gear casing 23, as shown in Figure 6, opens into the passageway 22 which extends through its respective arm 18. A shaft 24 is journalled in the end walls of each casing 23 for rotation about an axis which extends across the longitudinal axis of the support 10 at a right angle thereto and which lies in a substantially horizontal plane when the instrument is in use. The back end 25 of each gear casing 23 provides a bearing for its shaft 24 while a bearing block 26, mounted in the front end of the casing and secured thereto by set screw 27, provides a second shaft bearing.

Each shaft 24 has a pinion 28 suitably fixed thereto at a position thereon which lies between the bearings 25 and 26. Means for rotating each shaft 24 and its pinion 28 employ a finger piece 29 which is screwed onto the threaded outer end of the shaft and which is locked thereon by a nut 30. The pinion 28 in each casing 23 is located over one of the racks 17 formed on the support 10 and is adapted to cooperatively engage the teeth of such rack. Thus, suitable rotation of either or both of the finger pieces 29 will cause the arms 18 to be selectively moved back and forth on the support 10, movement along a similar path being given to the lens cells carried by the arms.

The scales on the plates 15 are designed to give the pupillary distance for different separations of the lens cells. To read these scales, the front wall of each arm 18 is provided with a cutaway portion 31 which, as shown in Figures 1 and 3, opens into the passageway 22 of its respective arm 18. The portion 31 serves as a sight opening which is always positioned in front of the channel 14 so that the scales of the latter may be readily observed and compared with an index mark 32 at the bottom of each cutaway portion.

The present invention employs an assembly for supporting the nosepiece so that it may be adjusted to fit a variety of facial characteristics. One desirable adjustment is to provide means for rotating the nosepiece about the support 10. For this purpose, use is made of a collar 33 which is adapted to be rotatably mounted on the support 10 and which has a yoke 34 integral therewith. The nosepiece itself is supported from the yoke 34 in a manner presently set forth. Collar 33 is given an internal cross section which approximates the non-circular cross section of support 10 in size and shape. This permits the collar to be slipped over the support 10 and located on the intermediate portion 11 of the support.

As shown in Figures 4 and 5, the intermediate portion 11 of support 10 is of reduced size as compared to the main portion of the support and is of a cross sectional shape which is circular. Shoes 35 and 36, positioned within the collar 33, are employed to mount the collar for rotation on the trial frame support member. Each shoe has one surface which has a radius substantially equal to that of the circular intermediate portion 11 of the support while its other surface conforms to the non-circular contour of the inner surface of the collar 33. This construction allows each shoe to be made of varying thickness so that substantially all portions of its surfaces will contact the intermediate portion 11 and the inner surface of the collar. Each of the two shoes contact the intermediate portion 11 for about 180° with their surfaces of constant radius adjacent to that portion of the support 10.

Shoes 35 and 36 are positioned to have their thickest portions respectively adjacent to the ends 37 and 38 of the collar 33. Screws 39 are threaded into the end 38 of the collar and extend into bores in the shoe 36. As shown in Figures 4 and 5, each screw 39 has a threaded portion and a reduced unthreaded portion. The shoulder formed between these two portions of each screw 39 is in bearing on the non-circular surface of the shoe 36. By this construction, pressure will be exerted on shoes 35 and 36 in accordance with the position of the screws 39. Sufficient pressure is provided on the shoes by the screws 39 to maintain the former in the relative positions which they occupy in Figure 4 so that they will rotate with the collar 33. At the same time, the position of screws 39 will control the friction developed between the shoes 35 and 36 and the intermediate portion 11 to the end of determining the ease with which the collar 33 is to be rotated about the support member of the trial frame, it being obvious that the disclosed construction affords means for rotatably mounting the collar.

The nosepiece for the trial frame is carried from a tube 40 which is pivoted within the yoke 34 by a pivot pin 41 that extends through the yoke and also through a pivot bearing 42 on the tube. Tube 40 is provided at its end adjacent yoke 34 with a flange 43 which serves as a bearing for rotatably supporting a shaft 44 having a main section 45 which is entirely threaded and a reduced section 46 which is partially threaded. Shaft 44 is adapted to have its threaded section 45 located entirely within the tube 40 and its section 46 to extend through the bearing flange 43.

Means for mounting the shaft 44 comprise an internally threaded finger piece 47 which is engaged with the threaded portion of the reduced section 46 of the shaft so as to hold the shoulder, formed by the two sections of the shaft, in contact with the inner surface of the bearing flange 43. Under this condition, finger piece 47 will contact the outer surface of the bearing flange 43 and may be so retained by use of a lock nut 48 which is engaged with the reduced section of shaft 44 in the manner shown.

A nosepiece 49 is pivotally mounted between the bent over ends of a suitable support arm which is secured to one end of a sleeve 50. This sleeve 50 is adapted to extend within the tube 40 and is provided with an internally threaded section which is engaged with the threaded section 45 of shaft 44. By use of a screw 51 which extends through tube 40 and which is engaged by a slot 52 in the sleeve 50, it will be apparent that rotation of finger piece 47 will cause the sleeve and hence the nosepiece 49 to be moved longitudinally of the tube 40. This movement of the nosepiece is highly desirable as it permits vertical adjustment thereof. Measurement of the vertical position of the nosepiece is effected with the aid of scale means 53 which are located, as shown in Figure 1, on the sleeve 50.

Pivoting movement of tube 40 about the pin 41 is controlled by an adjustable stop screw 54 carried by the yoke 34. Tube 40 is constantly urged against the stop 54 by a spring 55, one end of which latter is fastened to collar 33 by any suitable means. The pivoting adjustment of the tube 40 is of aid in moving the nosepiece towards or away from the face as is also the case of the rotation adjustment of the nosepiece assembly.

Means for connecting each temple 56 to the support 10 employs a bar member 57 to which the temple is fixedly secured by any suitable means and which is provided at one end with a threaded bore in which the adjusting screw 58 is mounted. Ears 59 project transversely from the top and bottom surfaces of the members 57 and receive the end of a pivot arm 60 to which they are pivoted by a pivot screw 61. The trial frame is adapted to different head sizes by suitably pivoting each temple about its pivot axis through its screw 61 upon appropriate rotation of the adjusting screw 58, the end of the latter being adapted to contact a projection 62 on each pivot arm 60.

As best shown in Figures 1, 2 and 7, the end of each pivot arm 60 opposite to screw 61 is drilled or otherwise provided with a hub 63 and bore 64, the axes of which latter are located at right angles to each other and lie in substantially parallel planes. In this construction, the axis of each bore 64 and the pivot axis through the adjacent pivot screw 61 are located in substantially parallel relation. The hub of each pivot arm 60 is rotatably mounted on one of the spindles 12. Each spindle 12 is internally threaded so that the pivot arm 60 therefor may be retained thereon by a washer and screw construction indicated at 65.

These just described means permit the pivoting of the temples 56 about the longitudinal axis of the support 10 in order to vertically adjust the lens cells 19 of the trial frame before the eyes of a wearer. Clamp means for retaining each pivot arm 60 in adjusted position makes use of clamp blocks 66 and 67 which are slidable in the bore 64 of each pivot arm. It is to be noted that each bore 64 intersects its adjacent hub 63 so that these passageways open into each other. This expedient permits each pair of clamp blocks 66 and 67 to be moved into clamping engagement with their respective spindle 12 at a location on opposite sides of a plane which is normal to the longitudinal axis of the bore 64 and which passes through the center of such spindle.

As shown in Figure 7, each clamp block 66 and 67 is provided with a passageway through which a shaft 68 extends. One end of each shaft 68 is threaded and the other end has a finger piece 69 suitably fixed thereto. Each clamp block 67 is internally threaded and engaged with a shaft 68 while each clamp block 66 is provided with an enlarged passageway to allow the unthreaded portion of the shaft to extend freely therethrough. The clamping surface of each clamp block is curved and has a radius which is substantially equal to that of each spindle 12. Thus, each pair of clamp blocks 66 and 67 will be moved into clamping engagement with their respective spindle 12 to effectively lock their respective pivot arm 60 in a desired position upon suitable rotation of their respective finger piece 69. Opposite rotation of such finger piece will loosen the clamp blocks and permit readjustment of the temple.

Operation of the trial frame will be apparent, by reason of the foregoing description, to those skilled in the art. The various adjustments herein set forth, will when properly made, fit the trial frame to the face of a patient. Upon completion of the adjustment procedure, the instrument is in readiness for conducting the usual examination which is carried out in the customary manner.

It will be appreciated that the aims and objects of the invention have been attained in that the construction herein set forth provides a strong and rugged instrument as well as a device wherein the various parts are securely maintained in positions affording best operation and efficient examination. At the same time, the design which has been described possesses great simplicity and readily permits the incorporation of features in the trial frame which lead to its quick and convenient adjustment.

We claim:

1. A trial frame having in combination a tubular support which has opposite end portions of curvilinear cross section and non-circular shape aligned and integral with which is a cylindrical intermediate portion having a cross section of an area less than the area of the non-circular cross section of said support, a pair of arms, each arm having an opening therethrough of a size and shape which substantially conforms to the non-circular cross section of said support, each opening located near one end of its arm, a lens cell on each arm at its end opposite the opening in the arm, each arm being slidably mounted on said support to have the support extend through the opening therein, a one piece substantially rigid collar having an internal surface the contour of which substantially conforms to the non-circular cross section of said support, said support extending through said collar, mounting means for securing said collar on the intermediate portion of said support whereby it is rotatable about said intermediate portion, said mounting means contacting substantially the entire internal surface of said collar and substantially the entire cylindrical surface of said intermediate portion, a member which carries a nosepiece, means connecting said member and collar to each other, each end portion of said support being provided with spaced slots, and pinion means carried on each arm in operative engagement with said slots whereby to selectively position each arm at a desired position on said support on actuation of said pinion means.

2. In a trial frame, an elongate tubular support of substantially elliptical cross-sectional shape, a pair of arms, a lens cell depending from each arm, each arm provided with an opening having a shape substantially equal in size and shape to the cross-sectional shape of said support, said support extending through the opening in the arms which are slidable lengthwise of the support, said support having a plurality of spaced parallel openings formed in the wall thereof, the portions of the wall of said support intermediate said openings forming rack means, pinion means carried by each arm and engaging with the rack means of said support whereby actuation of said pinion means moves said lens cells in paths parallel to said support.

3. In a trial frame of the type described, an elongated tubular support of substantially elliptical cross-sectional shape having a reduced intermediate portion of circular cross-sectional shape, a one-piece substantially rigid collar having an interior surface the contour of which approximates the size and shape of the substantially elliptically cross-sectional shape of said support, means for engaging substantially the entire cylindrical surface of said intermediate portion of said support and carried within and engaged by the interior surface of said collar whereby the collar is rotatably mounted on said intermediate portion, a nosepiece, and connection means securing said nosepiece to said collar.

4. In a trial frame of the type described, an elongate tubular support of substantially elliptical cross-sectional shape having a reduced intermediate portion of circular cross-sectional shape, a pair of shoes having inner surfaces engaging opposite sides of said reduced portion, the outer surfaces of said shoes being so shaped as to be substantially flush with the outer surface of said support, a collar having an opening therein substantially equal in size and shape to the cross-sectional shape of said support and circumscribing said shoes, means for connecting said collar to at least one of said shoes so that said collar may be rotated about an axis substantially coincident with the axis of said reduced portion, said connecting means including means for urging the inner surface of one of said shoes against the outer surface of said reduced portion whereby said collar may be held in a desired adjusted position, a nosepiece, and means for connecting said nosepiece to said collar.

5. In a trial frame, an elongated tubular support of non-circular cross-sectional shape, a pair of spaced arms, each arm provided with an opening through which said support extends and having a shape substantially equal in size and shape to the cross-sectional shape of said support, said arms being reciprocally slidable lengthwise of the support, means for limiting the reciprocal movement of said arms, a lens cell depending from each arm and movable therewith, a reduced portion formed intermediate the ends of said support, said portion having a circular cross-sectional shape, a pair of members circumscribing said reduced portion, the outer surfaces of said members being substantially flush with the surface of said support, a collar having an opening of a shape substantially equal in size and shape to the cross-sectional shape of said support, the walls of the opening of said collar engaging the outer surfaces of said members, means for connecting said collar to one of said members whereby said collar may be rotated with said members about the cylindrical surface of said reduced portion, a nosepiece, and means for connecting said nosepiece to said collar for movement therewith.

OLIN W. BOUGHTON.
HENRY F. KURTZ.